United States Patent [19]

Nagasawa et al.

[11] Patent Number: 4,932,018
[45] Date of Patent: Jun. 5, 1990

[54] INTEGRATED CIRCUIT FOR GENERATING INDEXING DATA IN A CD PLAYER

[75] Inventors: Naobumi Nagasawa, Ooizumi; Teruo Houshi, Oota; Hiroyuki Arai, Ooizumi, all of Japan

[73] Assignee: Sanyo Electric Co., Ltd., Osaka, Japan

[21] Appl. No.: 271,041

[22] Filed: Nov. 14, 1988

[30] Foreign Application Priority Data

Nov. 19, 1987 [JP] Japan ................. 62-292434
Nov. 19, 1987 [JP] Japan ................. 62-292435
Nov. 19, 1987 [JP] Japan ................. 62-293436
Nov. 19, 1987 [JP] Japan ................. 62-293437

[51] Int. Cl.$^5$ .............................................. G11B 7/00
[52] U.S. Cl. .................................................... 369/59
[58] Field of Search ............... 369/48, 49, 59, 111, 369/30, 32; 360/38.1; 358/336; 371/31

[56] References Cited

U.S. PATENT DOCUMENTS

| | | | |
|---|---|---|---|
| 4,495,474 | 1/1985 | Nishikawa et al. | 369/59 |
| 4,541,093 | 9/1985 | Furuya et al. | 369/49 |
| 4,682,317 | 7/1987 | Tomisawa | 369/59 |
| 4,716,558 | 12/1987 | Katayama et al. | 369/32 |
| 4,796,247 | 1/1989 | Vogelsang | 369/44 |

*Primary Examiner*—Vincent P. Canney
*Attorney, Agent, or Firm*—Stanger, Michaelson, Reynolds, Spivak & Tobia

[57] ABSTRACT

An integrated circuit for a CD player includes an EFM decoder which converts an EFM signal inputted from a compact disc into symbols. Subcode data which includes first, second and third areas is outputted from the EFM decoder and stored in a first shift register. Data in the first area of the subcodes can be wholly stored in a memory circuit which is controlled on the basis of data in the second area of the subcodes and a signal applied from an external source, for example, a microcomputer by an R/W control circuit. Data in the third area of the subcodes is applied to the memory circuit as a writing address and address data inputted from the microcomputer is applied to the memory circuit as a reading address. One of data read from the memory circuit and data of the subcodes is selectively outputted from a selector to a second shift register which outputs the inputted data in response to clocks from the microcomputer to the same in a bit-serial fashion.

6 Claims, 2 Drawing Sheets

FIG. 2

|   | MSB | LSB |
|---|---|---|
|   | CONTROL DATA | ADDRESS |
| A | TRACK NUMBER | |
| B | INDEX | |
| C | TIME DURING PIECE OF MUSIC (MINUTES) | |
| D | TIME DURING PIECE OF MUSIC (SECONDS) | |
| E | FRAME | |
| F | BLANK | |
| G | TOTAL TIME (MINUTES) | |
| H | TOTAL TIME (SECONDS) | |
| I | FRAME | |

FIG. 3

| A | B | G | H | I |
|---|---|---|---|---|
| 0 0 | 0 1 | MINUTES | SECONDS | FRAME |
| 0 0 | 0 2 | MINUTES | SECONDS | FRAME |
| 0 0 | 0 3 | MINUTES | SECONDS | FRAME |
| ⋮ | ⋮ | ⋮ | ⋮ | ⋮ |
| 0 0 | N | MINUTES | SECONDS | FRAME |
| 0 0 | A 0 | 0 1 | — | — |
| 0 0 | A 1 | N | — | — |
| 0 0 | A 2 | MINUTES | SECONDS | FRAME |

INTEGRATED CIRCUIT FOR GENERATING INDEXING DATA IN A CD PLAYER

BACKGROUND OF THE INVENTION

1. Field of the invention

The present invention relates to an integrated circuit for a CD (compact disc) player and, more specifically, relates to processing of subcodes Q being read from a compact disc.

2. Description of the prior art

In a CD system, an 8 bit subcode is added to 32 symbols composed of 24 information symbols (each of which is 8 bits) and 8 parity symbols (each of which is 8 bits). These are EFM (Eight to Fourteen Modulation)-modified and recorded on a disc together with a 24 bit frame synchronization signal of 24 bits as a frame of 588 channel bits. Respective channels P, Q, R, S, T, U, V and W are assigned to subcodes, and the P and Q channels are utilized for finding a cue of a piece of music and for performing a program function 30 that a plurality of pieces of music can be reproduced in accordance with order being programmed in advance. Each channel of the subcodes is composed of 98 frames, that is, 98 bits. Specifically, a format of the subcode Q is constructed by synchronization signals S0, S1 for the subcode of 2 bits, control data of 4 bits, address data of 4 bits, data of 72 bits and CRC (Cyclic Redundancy Code) of 16 bits.

FIG. 2 is an illustrative view showing the data format of the subcode Q. As shown in FIG. 2, the subcode Q includes areas A–I represented by a BCD code of 8 bits other than the control data, the address data, and data of the track number, index, time (seconds, minutes) during a piece of music, the frame number during a piece of music, accumulated or total time (seconds, minutes) and the accumulated or total number of frames assigned to the areas A–I. The subcode Q is normally used for displaying the number and time of the piece of music during reproduction. However in order to find a cue of a piece of music and to perform a program function, the subcode Q which is recorded in a lead-in area formed on an inner periphery of the disc has assigned thereto the data of pieces of music recorded in the disc and data of a lead-out area formed on an outer periphery of the disc.

More specifically, the subcode Q of the lead-in area, as shown in FIG. 3, the area A is "00", area B is assigned the data of the track numbers of the pieces of music recorded in the disc, and areas G and H are assigned the start time of the piece of music of each of the track numbers, and area I is assigned the frame numbers from a start of each of the tracks to a start of each of the pieces of music. Furthermore, indexes called as "A0", "A1" and "A2" exhibit in the area B, and the track number of a first piece of music is recorded in the area G of index "A0" and the track number of a last piece of music is recorded in the area G of index "A1". Start time of the lead-out area is recorded in the areas G and H of index "A2", and the frame numbers to a start of the lead-out area is recorded in the area I of "A2". In addition, in the CD system, the number of the pieces of music capable of being recorded in the disc is 99 at most, that is, N=99. Thus, the kinds of the subcodes Q of the lead-in area become 102 at most.

A circuit for fetching such subcodes Q is normally built-in an integrated circuit for a CD player.

In such a subcode output circuit of a conventional integrated circuit for a CD player, the frame synchronization signal is detected from the EFM signal read from the disc, and the EFM signal following the frame synchronization signal is demodulated so as to obtain a subcode of the 8 bits, and the data of Q-channel in the subcode is applied to a shift register such that the subcodes Q can be stored for each frame to complete data of the subcodes Q. The data of the subcodes Q thus completed is outputted from the shift register to an external circuit, for example, a microcomputer in a bit-serial fashion. The microcomputer uses the subcodes Q being transferred in a bit-serial fashion so as to display the number of the piece of music and the time thereof and to obtain data for movement of an optical pick-up to an object value. A technique similar to the above has been disclosed in detail in, for example, Japanese Patent Laid-open Number 83261/1985.

If and when the above described conventional integrated circuit for a CD player is utilized, in the externally connected microcomputer, in order to perform various functions such as displaying the number of the piece of music, displaying the time or program selection of the piece of music, the subcode Q in the lead-in area must be received and stored in a memory circuit in advance.

However, the number of the subcodes Q in the lead-in area becomes 102 at most as described above, the bit number of the data thereof is 2,448 ($=8\times 3\times 102$) bits. On the other hand, a capacity of the memory circuit (RAM) of the microcomputer is 1K bits at most and the data necessary for other processing must be stored in the RAM, and therefore, it is impossible to store all of the subcodes Q and thus it is necessary to provide with another RAM to wholly store the subcodes Q. In addition, in the case where the playing time of the piece of music is confirmed by utilizing the subcodes Q in the lead-in area, it is necessary to obtain the time of a start of the piece of music and the time of a start of the next piece of music, and therefore, the RAM which stores the subcodes Q must be accessed twice by the microcomputer and thus a load of a program of the microcomputer becomes large.

SUMMARY OF THE INVENTION

Therefore, a principal object of the present invention is to provide a novel integrated circuit for a CD player.

Another object of the present invention is to provide an integrated circuit for a CD player, in which data of pieces of music recorded in a compact disc can be stored in advance in the integrated circuit.

Another object of the present invention is to provide an integrated circuit for a CD player, in which it is unnecessary to provide with a further memory circuit.

The other object of the present invention is to provide an integrated circuit for a CD player, in which a load of a program of a microcomputer which is externally connected to the integrated circuit and controls a CD player can be reduced.

An integrated circuit for a CD player in accordance with the present invention comprises an EFM decoder which converts an EFM signal read from a compact disc into symbols each of which is 8 bits; a first shift register which receives subcodes outputted from the EFM decoder; a memory circuit which is connected to the first shift register via a data bus so as to store data recorded in a first area of the subcodes; an R/W control circuit which controls writing or reading of the memory circuit in accordance with data recorded in a second area of the subcodes and a signal being applied from an external; an address control circuit which respectively applies data recorded in a third area of the subcodes as a writing address and address data being applied from the external as a reading address to the memory circuit; a selector which selectively outputs data read from the memory circuit and data of the subcodes received by the first shift register; and a second shift register which receives an output of the selector and outputs to the external the inputted data in accordance with a clock being applied from the external.

In the above described integrated circuit for a CD player, subcodes Q recorded in the lead-in area of the compact disc can be stored in the memory circuit in advance, and two kinds of data can be simultaneously outputted from the memory circuit in accordance with addresses from the external.

More specifically, when the R/W control circuit detects that the track number recorded in the second area of the subcodes Q being received by the first shift register is "00" (BCD of 8 bits), the memory circuit is brought in a writing state in response to a detection output, and the data of the track number recorded in the third area of the subcodes Q is received by the address control circuit and applied to the memory circuit, whereby the data recorded in the first area of the subcodes Q is stored an area of the memory circuit which is addressed by the track number. Therefore, when the lead-in area of the compact disc is read by an optical pick-up, the data of the pieces of music recorded in the compact disc can be wholly stored in the memory circuit.

On the other hand, when a data requesting signal and address data are applied from the external, since the R/W control circuit brings the memory circuit in a reading state and the address control circuit applies to the memory circuit the address data being applied from the external, the data being stored in that address is read and transferred to a first latch circuit so as to be held therein. In addition, the address data being applied from the external is incremented by an adding means such that address data for addressing succeeding address can be generated. The address data is applied from the address control circuit to the memory circuit, and therefore, the data being stored in the succeeding address is read from the memory circuit and transferred to a second latch circuit so as to be held therein. The two data respectively held by the first latch circuit and the second latch circuit are applied to the second shift register through the selector and outputted from the second shift register to the external in a bit-serial fashion.

On the other hand, since the track number of a last piece of music recorded in the area G of the subcode Q is held in a third latch circuit when the area B of the subcodes Q received by the first shift register is "A1", if the address applied from the external is an address representing the last piece of music, a detection output is outputted from a coincidence detection circuit, and therefore, an address changing circuit outputs the track number of "A2" as an addres instead of the incremented data to the RAM. The data being stored in the address of "A2" is the time and the number of frames of the lead-out area and held by the second latch circuit. Therefore, the data being outputted from the second shift register becomes data of the last piece of music and the lead-out area.

Thus, the data of the subcodes recorded in the lead-in area can be wholly stored in the memory circuit in the integrated circuit for a CD player and outputted in response to a request from the external in a form capable of being easily processed.

In accordance with the present invention, since the data of the pieces of music recorded in the compact disc is outputted from the subcodes Q recorded in the lead-in area and wholly stored in the integrated circuit for a CD player in advance, there are advantages that it is not necessary to use a further memory circuit and that it is possible to use a microcomputer with a small memory capacity for controlling a CD player. In addition, even if only the microcomputer designates one track number, the data of the succeeding track number can be read, and therefore, it is possible to shorten programs for program selection of the pieces of music, cue of the piece of music, displaying of playing time or searching piece of music, and thus a load of such programs of the microcomputer can be reduced.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 2 is an illustrative view showing data assignment of subcodes Q.

FIG. 3 is an illustrative view showing data to be recorded in subcodes Q of a lead-in area.

DETAIL DESCRIPTION OF THE PREFERRED EMBODIMENTS

Figure 1:
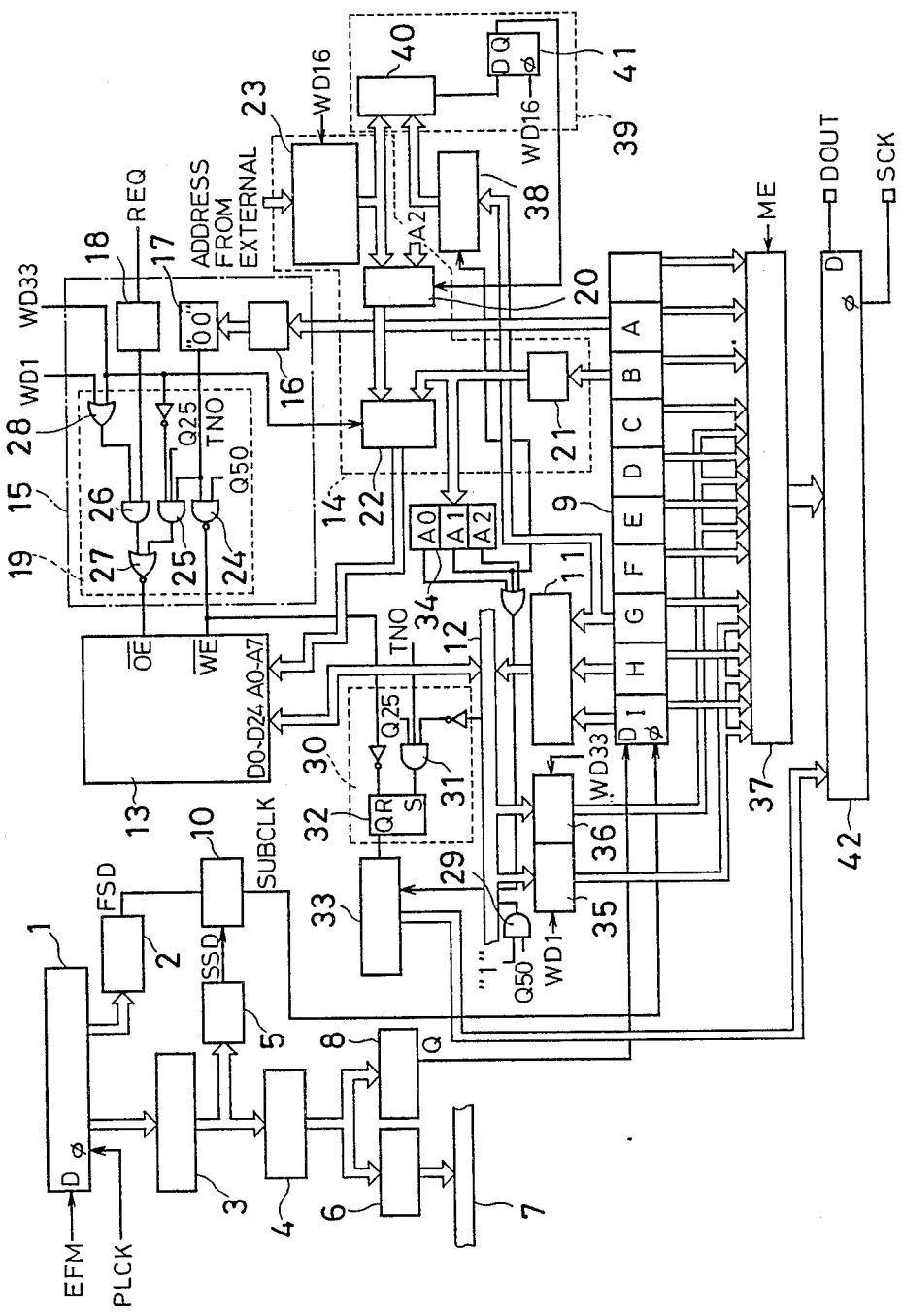
FIG. 1 is a block diagram showing one embodiment in accordance with the present invention.

FIG. 1 is a block diagram showing one embodiment in accordance with the present invention. A 22 bit shift register 1 receives an EFM signal read from a compact disc in accordance with 4.3218 MHz EFM synchronization pulses PLCK reproduced by a PLL(Phase Locked Loop) circuit (not shown). A frame synchronization signal detection circuit 2 detects that the EFM signal being inputted to the shift register 1 is a frame synchronization signal, i.e. that before and after 11 bits are values succeeding to each other, and the circuit 2 generates a detection output FSD when the same detects the frame synchronization signal. A 14 bit latch circuit 3 receives respective outputs from the 9th bit to the 22nd bit of the shift register 1 and holds 14 bits of one symbol succeeding to the frame synchronization signal. An output of the latch circuit 3 is applied to an EFM decoder 4 which converts the EFM signal of 14 bits into symbols each of which is 8 bits and a subcode synchronization signal detection circuit 5 which detects whether or not the 14 bit symbol represents a subcode synchronization signal. The subcode synchronization signal detection circuit 5 detects a synchronization signal S0 ("00100000000001" in a pattern of 14 bits) and a synchronization signal S1 ("00000000010010" in a pattern of 14 bits) and outputs a detection output SSD.

On the other hand, an output of 8 bits of the EFM decoder 4 is applied to a data bus 7 via a buffer 6, and information symbols of an audio signal and parity symbols are stored in an external RAM (not shown) via the data bus 7. In addition, the output of the EFM decoder 4 is also connected to a subcode register 8, and if the data being outputted is the subcode, the subcode data is held in the subcode register 8. Furthermore, a bit representative of the Q channel of the subcode is applied to a data input of a first shift register 9.

The first shift register 9 is constructed of 80 bits and sequentially shifts and stores the applied data in accordance with shift clocks SUBCLK being applied from a shift control circuit 10. The shift control circuit 10 generates the shift clocks SUBCLK based upon the detection outputs SSD and FSD. This means that the shift control circuit 10 generates 80 shift clocks SUBCLK in synchronous with each completion of inputting the symbol of 14 bits of the EFM signal succeeding to the frame synchronization signal for each time when the detection output FSD is outputted after detection of the subcode synchronization signals S0 and S1. Therefore, in the first shift register 9, the data of the subcodes Q of 80 frames period succeeding to the subcode synchronization signals S0 and S1, that is, the control data of 4 bits, the address data of 4 bits and the information data of 72 bits are stored.

A latch circuit 11 is a latch of 24 bits which temporarily holds areas G, H and I which are a first area of the subcodes Q shown in FIG. 2. The latch circuit 11 is connected to outputs of the least significant 24 bits of the first shift register 9, that is, bit outputs corresponding to the areas G, H and I of the subcodes Q, and an output of the latch circuit 11 is connected to a data bus 12.

A memory circuit (RAM) 13 is a static memory having a capacity of 3K bits. In order to store the subcodes Q fetched from the lead-in area, the memory circuit 13 is addressed by the 8 bit BCD data representative of the track number, and an area thus addressed is constructed of 25 bits (24 bits + a check bit). Therefore, information of the pieces of music read from the lead-in area as shown in FIG. 3 can be wholly stored in the memory circuit 13 as addressed by the data of the track number of each of the pieces of music. Data inputs/outputs D0–D24 of the RAM 13 are connected to the data bus 12 of 25 bits, and address inputs A0–A7 are connected to an output of an address control circuit 14, and a write control input $\overline{WE}$ and a read control input $\overline{OE}$ are both connected to an R/W control circuit 15.

The R/W control circuit 15 is constructed of a latch circuit 16, a track number zero detection circuit 17, a data request receiving circuit 18, and a gate circuit 19, and the address control circuit 14 is constructed of a latch circuit 21, an address changing circuits 20 and 22, and a read address input circuit 23. The latch circuit 16 is connected to 8 bit outputs of the first shift register 9 corresponding to the area A (shown in FIG. 2) which is a second area for storing the track number of the subcodes Q. An output of the latch circuit 16 is applied to the track number zero detection circuit 17. More specifically, it is detected whether or not the track number of the subcodes stored in the first shift register 9 is "00" (BCD), and when the track number is "00", the track which is now being read is recognized as the lead-in area and a write control signal TNO is outputted from the track number zero detection circuit 17 to the gate circuit 19. On the other hand, the data request receiving circuit 18 applies a read control signal ME to the gate circuit 19 and the address changing circuit 22 in response to a data request signal REQ from the external system, for example, the microcomputer. The gate circuit 19 is composed of a NAND gate 24, AND gates 25 and 26, a NOR gate 27, and an OR gate 28. The write control signal TNO and a second timing signal Q50 are applied to the NAND gate 24 an output of which is applied to the write control input $\overline{WE}$ of the RAM 13. The write control signal TNO, a first timing signal Q25 and the read control signal ME are applied to the AND gate 25 an output of which is applied to the NOR gate 27, and output of the NOR gate 27 is applied to the read control input $\overline{OE}$ of the RAM 13.

In addition, the timing signals Q25 and Q50 are signals which are outputted from a counter (not shown) which counts the frame synchronization signals FSD so as to obtain the frame number necessary for storing and completing the subcodes at times when count values of the counter reach "25" and "50", respectively. Therefore, when no read request signal REQ is given, if the write control signal TNO becomes "H", the RAM 13 is brought to a reading state in response to the timing signal Q25 which is early generated, and the RAM 13 is brought to a writing state in response to the timing signal Q50 which is generated later.

In addition, the latch circuit 21 is connected to outputs 8 bit of the first shift register 9 corresponding to an area B (FIG. 2) which is a third area for storing indexes of the subcodes Q. The latch circuit 21 receives data which is stored and representative of the recorded track number as address for the RAM 13. When no read request signal REQ is applied, the address changing circuit 22 which is controlled by the read control signal ME applies the data held in the latch circuit 21 to the RAM 13 as an address thereof. Therefore, the address for reading and writing the RAM 13 at timings Q25 and Q25 become coincident with each other.

On the other hand, read timing signals WD1 and WD33 which are assigned within one frame period of operation timing are applied to the OR gate 28 an output of which is applied to AND gate 26 together with the read control signal ME, and an output of the AND gate 26 is applied to the NOR gate 27. Therefore, when the data request signal REQ is applied from the external system, for example, the microcomputer, the RAM 13 is brought in a reading state in response to the read timing signals WD1 and WD33.

In addition, the read address input circuit 23 holds the data representative of the track number succeeding to the data request signal REQ sent from the microcomputer and applies the same to the address changing circuit 20 as the address of the RAM 13. Furthermore, the read address input circuit 23 includes a means for adding +1 to the inputted address data. More specifically, the read address input circuit 23 is constructed by a presettable register having an incrementing function, and such an incrementing function is performed in response to a timing signal WD16 which is generated at a middle timing between the first read timing signal WD1 and a next read timing signal WD33.

The address changing circuit 22 applies the output of the latch circuit 21 to the address inputs A0–A7 of the RAM 13 when no read control signal ME is outputted from the data request receiving circuit 18, and applies the data outputted from the address changing circuit 22 and held in the read address input circuit 23 to the address inputs A0–A7 when the read control signal ME is outputted. Therefore, where the data request signal REQ is applied from the external, the RAM 13 is accessed in accordance with address being applied from the external.

On the other hand, a "1" output circuit 29 for writing the logic "1" into the check bit of the RAM 13 is provided on a line which communicates the check bit of the RAM 13 out of the data bus 12. The "1" output circuit 29 outputs "1" to the data bus 12 in response to the timing signal Q50 which brings the RAM 13 to a writing state. Therefore, at the timings when the areas G, H and I of the subcodes Q are stored in the RAM 13, "1" are simultaneously stored in the check bit.

In addition, a check pulse generating circuit 30 is constructed of an AND gate 31 which receives an inverted signal of the communication line of the check bit of the data bus 12, the timing signal Q25 and the write control signal TNO, and an R-SFF 32 which is set by an output of the AND gate 31 and reset by an inverted signal of a signal applied to the write control input WE of the RAM 13. When the data is read from the RAM 13 at the time of the timing signal Q25, if the check bit is "0", that is, no data has not been written into the address, R-SFF 32 is set, and if the data has been written and thus the check bit is "1", the R-SFF 32 is not set. Then, the R-SFF 32 is reset when writing of the RAM 13 is performed at the time of the timing signal Q50. This means that only when the data of the areas G, H and I are respectively and initially written in respective addresses of the RAM 13, the pulses are generated from the check pulse generating circuit 30. This is so because a number of data as shown in FIG. 3 are recorded in the lead-in area and writing operations of the same data are performed a plurality of times. In order to avoid erroneous operations, only one pulse can be generated with respect to the writing operations of the same data.

A counter 33 to which an output of the check pulse generating circuit 30 is applied is an 8 bit BCD counter and counts "00"-"99". Such a counting operation of the counter 33 is controlled by respective outputs of an "A0", "A1" or "A2" detection circuit 34. More specifically, where the data recorded in the area B of the subcodes Q which are stored in the first shift register 9 is the index "A0", "A1" or "A2", counting operation of the counter 33 is inhibited. Therefore, a counted value of the counter 33 is coincident with the data representative of the number of the pieces of music, which is stored in the RAM 13.

Furthermore, a first latch circuit 35 and a second latch circuit 36 respectively constructed of 24 bits are connected to the data bus 12. A latching operation of the first latch circuit 35 is controlled by the read timing signal WD1 and a latching operation of the second latch circuit 36 is controlled by the read timing signal WD33. Outputs of the first and second latch circuits 35 and 36 are applied to a selector 37. In addition, a third latch circuit 38 is constructed of 8 bits, and receives outputs of 8 bits of the first shift register 9 storing the area G of the subcodes Q. An output of latch circuit 38 is applied to a coincidence detection circuit 39 together with an output of the read address input circuit 23. A latching operation of the third latch circuit 38 is controlled by an output of an "A1" detection circuit 34 which detects that the data being latched in the latch circuit 21 is the index "A1". Therefore, the track number N (FIG. 3) representative of the last piece of music, which is recorded in the area G in the subcodes Q in which "A1" is recorded is latched in the third latch circuit 38. The coincidence detection circuit 39 includes a coincidence circuit 40 which detects whether or not both data of the read address input circuit 23 and the third latch circuit 38 are coincident with each other, and a D-FF 41 fetching such a coincidence output. A clock of the D-FF 41 is the timing signal WD16 for incrementing the address input circuit 23. Therefore, a result of coincidence detection of the data before increment in the read address input circuit 23, that is, the address being applied from the external and the data of the third latch circuit 38 is outputted from an output Q of the D-FF 41 after the timing signal WD16 is generated, and the output is applied to the address changing circuit 20. The address changing circuit 20 changingly outputs an address of the read address input circuit 23 and the data representative of the address "A2", and outputs the address "A2" when the coincidence outputs from the D-FF 41 is applied thereto.

The selector 37 is controlled by the read control signal ME from the data request receiving circuit 18, and when no read control signal ME is outputted, that is, no data request from the external exhibits, outputs the subcodes Q stored in the first shift register 9 to a second shift register 42. When the read control signal ME is outputted in accordance with the data request from the external, the selector 37 outputs an output of the first latch circuit 35 instead of bit outputs of the first shift register 9 which stores the areas G, H and I of the subcodes Q, and outputs an output of the second latch circuit 36 instead of bit outputs of the first shift register 9 which stores the areas C, D and E of the subcodes Q to the second shift register 42. The second shift register 42 is constructed by 88 bits in total including 80 bits for receiving the data from the selector 37 and 8 bits for receiving the data from the counter 33. The data being held in the second shift register 42 is outputted from an external terminal Dout in a bit-serial fashion in accordance with shift clocks SCK being applied from the external.

In addition, the shift clocks SCK may be generated within the integrated circuit. In such a case, the shift clocks SCK generated internally are applied to the second shift register 42 and outputted to the external in synchronous with the data outputted from the second shift register 42 in a bit-serial fashion.

The following describes the above described embodiment with reference to FIG. 1.

First, detailed is the operation by which the optical pick-up reads the EFM signal of the lead-in area of the compact disc and the subcodes are stored in the RAM 13.

In reading, the subcodes Q are stored in the first shift register 9 for every 98 frames and, when the subcodes Q are completed, respective data are held in the latch circuits 11, 16 and 21. Since the track number recorded in the area A of the subcodes Q in the lead-in area is "00", this is detected by the track number zero detection circuit 17, and the write control signal TNO is outputted therefrom so as to bring the RAM 13 into a writing state. At the same time, as shown in FIG. 3, since the track number recorded in the area B of the subcodes Q is applied to the RAM 13 as the address data from the latch circuit 21 via the address changing circuit 22, in the address being represented by that address data, the data of the time of the pieces of music recorded in the areas G, H and I of the subcodes Q as shown in FIG. 3, the frame data thereof, and "1" generated by the "1" output circuit 29 are stored in the RAM 13 at the timing of the timing signal Q50. Then, when the next timing signal Q25 is generated, the RAM 13 is brought in a reading state. At this time, if the address of the latch circuit 21 is not changed, the check bit "1" stored in that address is read, and therefore, the R-SFF 32 of the check pulse generating circuit 30 can not be set, and if the address of the latch circuit 21 is changed, the R-SFF 32 is set and the counter 33 is counted up.

By repeating such a storing operation, all of the data shown in FIG. 3 are stored in the RAM 13 at addresses addressed by the track number and the indexes "A0", "A1" and "A2".

In addition, since a counting operation of the counter 33 is inhibited by the output of the detection circuit 34 when the addresses being held in the latch circuit 21 are "A0", "A1" and "A2", the counted value of the counter 33 becomes numeral value representative of the number of the pieces of music. Furthermore, when the detection circuit 34 detects "A1", the track number N of the last piece of music recorded in the area G of the index "A1" is held in the latch circuit 38 in response to the detection output.

Next, reading operation when the microcomputer applies the data request signal REQ to the data request receiving circuit 18 will be made in the following.

When the data request receiving circuit 18 outputs the read control signal ME, the RAM 13 is brought in a reading state at the timing of the timing signal WD1, and the track number which is applied from the microcomputer (not shown) to the read address input circuit 23 is applied to the RAM 13 via the address changing circuits 24 and 22 such that the data stored in that address can be read. The data thus read is held in the first latch circuit 35 which is controlled by the timing signal WD1 via the data bus 12. Furthermore, when the timing signal WD16 is generated, in the read address input circuit 23, +1 is added to the track number previously inputted from the microcomputer so as to generate the data of the next track number. Then, when the timing signal WD33 is generated, the RAM 13 is brought in a reading state again such that the data being stored in the address accessed by the data of the next track number can be read. The data thus read is held in the second latch circuit 36 which is controlled by the timing signal WD33 via the data bus 12.

On the other hand, in the case where the track number applied from the external to the read address input circuit 23 is coincident with the data representative of the track number of the last piece of music being held in the third latch circuit 38, at the timing of the timing signal WD1, the data of the last piece of music is read from the RAM 13 by using the track number of the last piece of music as an address, and the same is latched in the first latch circuit 35. At the timing of the timing signal WD33, in accordance with the coincidence output being outputted from the D-FF 41, the address of "A2" is accessed instead of the address incremented such that start time of the lead-out area and the frame number stored in the address of "A2" can be transferred from the RAM 13 to the second latch circuit 35.

Then, two kinds of data being held in the first and second latch circuits 35 and 36 are applied to the second shift register 42 via the selector 37, and the data representative of the number of the pieces of music being held in the counter 33 is also applied to the second shift register 42, and these data is outputted to the external in a bit serial fashion.

Therefore, by applying one track number from the microcomputer, not only the data corresponding to the track number but also the data corresponding to the next track number and the data representative of the number of the pieces of music can be fetched. Furthermore, in the case where the track number of the last piece of music is designated, it is possible to fetch not only the data of the last piece of music but also the start time and the frame number of the lead-out area, and therefore, playing time of the last piece of music can be evaluated by a simple subtracting operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. For a CD player connected to an external circuit, an integrated circuit, comprising:
    an EFM decoder for converting an EFM signal read from a compact disc into symbols each of which is 8 bits;
    a first shift register for storing subcodes outputted from said EFM decoder;
    a memory circuit which is connected to said first shift register through a data bus to store data recorded in a first subcode area of said register;
    an R/W control circuit for controlling writing and reading of said memory circuit in accordance with data recorded in a second subcode area of said register and a signal applied from the external circuit;
    an address control circuit for applying data recorded in a third subcode area of said register and address data from the external circuit to said memory circuit as a writing address and a reading address, respectively;
    a selector for selectively outputting data read from said memory circuit and subcode data stored in said first shift register; and
    a second shift register for receiving an output of said selector and sending inputted data to the external circuit in response to a clock.

2. An integrated circuit in accordance with claim 1, wherein said clock to said second shift register is applied from the external circuit.

3. An integrated circuit in accordance with claim 1, wherein said clock to said second shift register is generated within the integrated circuit and applied to said second shift register.

4. An integrated circuit in accordance with claim 1, wherein said memory circuit includes means for storing the data recorded in the first area of said subcodes and a check bit corresponding to said data, and further comprising
    writing means for writing a predetermined logic value in said check bit in writing the data recorded in the first area of said subcodes,
    a check pulse generating circuit for writing pulses in accordance with a content of said check bit being read,
    a counter for counting the pulses from said check pulse generating circuit, and
    means for applying a counted value of said counter to said second shift register.

5. An integrated circuit in accordance with claim 1, wherein said address control circuit includes incrementing means for incrementing address data applied from the external circuit, and means for applying a result of said incrementing means successively to said address data applied from the external circuit to said memory circuit, and further comprising
    a first latch circuit for latching data read in accordance with said address applied from the external circuit, and a second latch circuit for latching data read in accordance with said address data incremented, said selector including means for alternately emitting an output of said first shift register and outputs of said first and second latch circuits.

6. An integrated circuit in accordance with claim 3, further comprising detection means for detecting that the data of a third subcode area stored in said first shift register is specific data, a third latch circuit for latching predetermined data of the first subcode area in response to an output of said detection means, and a coincidence detection circuit for detecting that both of the address data applied from the external circuit and data being latched in said third latch circuit are coincident with each other, said address control circuit including an address changing circuit for applying predetermined address data to said address control circuit instead of said incremented address data in response to a detection output of said coincidence detection circuit.

* * * * *